United States Patent
Gaspard

[11] Patent Number: 5,706,307
[45] Date of Patent: Jan. 6, 1998

[54] METHOD AND ARRANGEMENT FOR THE DETERMINATION OF THE RATIO FOR COMMON-CHANNEL OR ADJACENT-CHANNEL INTERFERERS IN DIGITAL MOBILE COMMUNICATION NETWORKS

[75] Inventor: Ingo Gaspard, Bonn, Germany

[73] Assignee: DeTeMobil Deutsche Telekom Mobilfunk GmbH, Germany

[21] Appl. No.: 405,583

[22] Filed: Mar. 17, 1995

[30] Foreign Application Priority Data

Mar. 18, 1994 [DE] Germany .................. 44 09 455.8

[51] Int. Cl.⁶ .................. G01R 29/26; H04B 1/10
[52] U.S. Cl. .................. 375/227; 455/226.3
[58] Field of Search .................. 375/224, 285, 375/346, 348, 227, 254; 455/296–297, 309, 312, 226.3

[56] References Cited

U.S. PATENT DOCUMENTS

| | | | |
|---|---|---|---|
| 4,457,006 | 6/1984 | Maine | 375/333 |
| 4,807,256 | 2/1989 | Holmes et al. | 375/344 |
| 5,506,869 | 4/1996 | Royer | 374/224 |
| 5,603,087 | 2/1997 | Shultz | 455/52.3 |

Primary Examiner—Young T. Tse
Attorney, Agent, or Firm—Brown, Martin, Haller & McClain

[57] ABSTRACT

In accordance with the invention, the incoming receiver signal is subject to an envelope demodulation by means of a measuring receiver 2. Subsequently, for a defined measurement time $T_{ges}$) in defined time differences $\Delta T$, the signal is sampled and digitized via an analog/digital converter 3 and stored in a computer 4 as a consecutive sequence of 1–N values of the square of the envelope function $R^2(t)$. From these stored values the auxiliary values X' and Y' are generated, whereby Y' is corrected by means of an appropriate correction factor k. Then, the C/I ratio is determined via the proper procedures. The method of the invention distinguishes itself in that, with relatively little expenditure and taking into consideration the typical features of the GSM mobile communication network, and based on the receiving power as a function of time, the C/I ratio is determined from the values of the function of this time function by means of an analytical calculation.

4 Claims, 1 Drawing Sheet

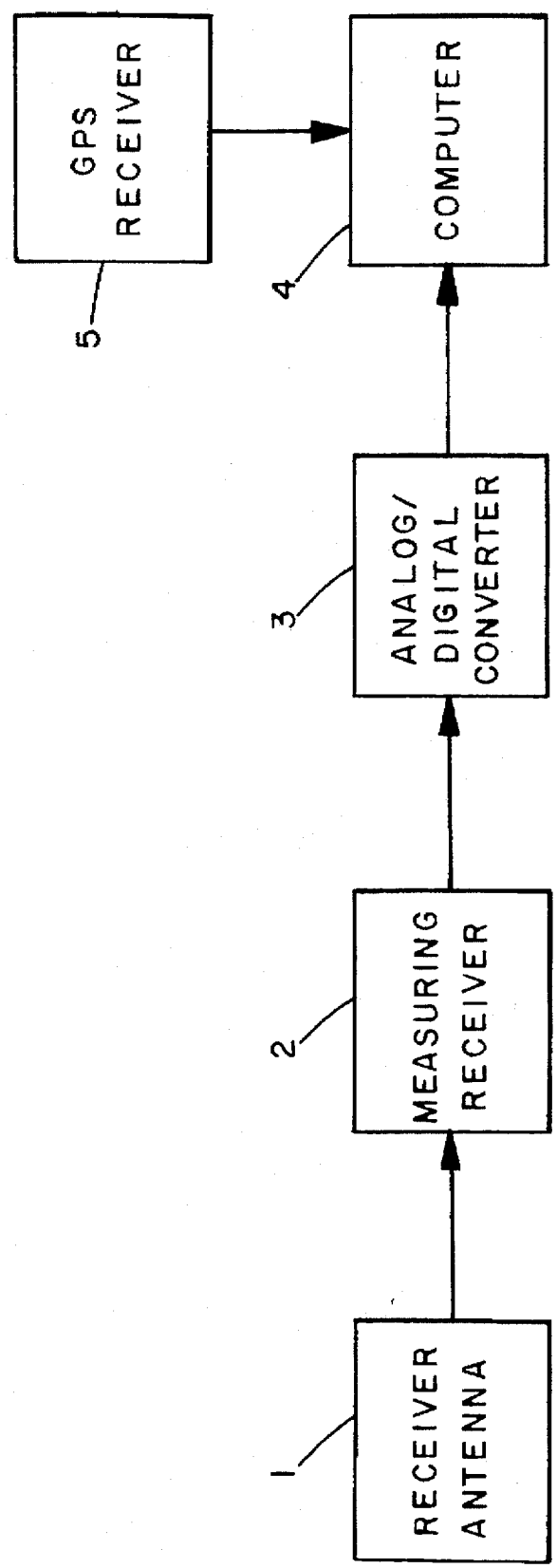

METHOD AND ARRANGEMENT FOR THE DETERMINATION OF THE RATIO FOR COMMON-CHANNEL OR ADJACENT-CHANNEL INTERFERERS IN DIGITAL MOBILE COMMUNICATION NETWORKS

BACKGROUND OF THE INVENTION

This invention is concerned with the determination of the ratio between a wanted signal and unwanted noise for common-channel and adjacent-channel interferers in digital mobile communication networks, and is particularly concerned with digital mobile communication networks complying with the GSM standard.

The C/I ratio is understood to mean the ratio of received powers between the wanted signal C (Carrier) and an unwanted noise signal I (Interferer) at the location of reception.

Until now, no method has become known which would allow to determine, in a direct way, the C/I ratios in digital mobile communication networks. "In a direct way" shall be understood to mean that the determination of the C/I ratio can be undertaken, without decoding of the information contained in the sent transmission, simply from a measurement-based acquisition of high-frequency values and from their processing, i.e. from the evaluation of the power received.

Known until now is that in GSM mobile communication networks, the relationship between received power RXLEV and bit error rate RXQUAL can be determined for a receiver in the form of calibration measurements, of common channel interference—in the case of an absence, and/or of common channel interferences—in the case of a defined influence. In this manner, through extensive laboratory measurements, one obtains measurement points of the relationship C/I=f (RXLEV; RXQUAL). Via this empirical method the receiver thus calibrated may be utilized for the determination of C/I in field measurements. Or, expressed in simpler terms, one recognizes a "bad" C/I relationship (i.e. a noise interferer exists) from the fact that the reception quality is "bad", i.e. the bit error rate is high, while simultaneously the receiving power is high.

In addition, methods to determine common-channel interferers in analog mobile communication networks are known which use a frequency modulation of high-frequency carrier waves. Such a method is described in the *IEEE Transactions on Vehicular Technology*, Vol. VT 36, No. 1, February 1987, pages 7–13.

The method used until now had the considerable disadvantage that drawing the conclusion that common-channel interference is present due to a "bad" reception quality in the case of simultaneously high receiving power is only valid if the assumption that quality-impairing causes other than common-channel interference during the measurement are present can be excluded. This conclusion simply cannot be ascertained, since during measurement, certain parameters like speed and a correlated fading profile would have to be known. In addition, the RXQUAL measurement and the RXLEV measurement are subject to errors according to the GSM Recommendation 0.5.08 which must not be overlooked in doing the desired measurement. The method used so far is very involved since, as described above, prior to any application extensive laboratory tests with respect to the relationship C/I=f (RXLEV; RZQUAL) must be conducted.

SUMMARY OF THE INVENTION

It is an object of the present invention to provide a new and improved method providing direct measurement of the C/I ratio in digital mobile communication networks using phase modulation of high-frequency carrier waves within the transmission band.

The object of the solution of the invention is the development of a considerably simpler and more logical method for the measurement of the C/I relationship for common-channel and adjacent-channel interferers. Such a solution would allow to dispense with the extensive calibration measurements used until now. Furthermore, such a process must avoid any intervention into the actual network operation. The new method must be able to properly integrate the typical features of the GSM mobile communication network such as, for example, the time-division multiplex frame structure (TDMA).

The method of the invention presupposes a phase modulation of high-frequency carrier waves within the transmission band. In a first processing step, the signal received at the location of reception from the receiver antenna 1 is subject to an envelope demodulation. Subsequently, during a defined measurement time $T_{ges}$ and in certain time intervals, the signal subject to the envelope demodulation is sampled and digitized. Thus, during the measuring time $T_{ges}$, in time intervals of $\Delta T$, N pairs of sampling values of the envelope function R(t) at the times ti and ti+$\Delta T$, with i=1–N, are digitized and stored as a consecutive sequence of 1–N of the square of the envelope function R2(t). From the stored values 1–N of the square of the envelope function R2(t) values, the auxiliary values X' and Y' are generated. The generation of the auxiliary value X' is based on the 1–N pairs of sampling values of the envelope function R(t) which are acquired during the measuring time $T_{ges}$ at the times ti and ti+$\Delta T$ and then digitized as a consecutive sequence with i=1–N. Subsequently, the N values of R(t) at the times ti; i=1–N are squared, the 1–N individual squares are added up, and the total is then divided by the number of N. The result of this calculation is called X'. The auxiliary value X' is proportional to the mean combined power at the receiver input of the individual signals, wanted signals s(t), and noise signals i(t) during the measurement time $T_{ges}$. The second auxiliary value Y' is also derived from the digitized sampling values of the envelope function R(t). First, the N differences of the sampling values of the envelope function are generated which have been squared and which are correlated through the time intervals $\Delta T$ of the sampling values of the envelope function. These differences are squared and added up. Then, the total number of N of the squared differences is divided by the number of N. By choosing an appropriate total measurement time $T_{ges}$ and the time difference $\Delta T$, the value Y' thus obtained is proportional to four times the product of the individual powers of the signals s(t) and i(t). Before any further processing occurs, the auxiliary value Y' is corrected by means of the correction factor (k). The correction factor k includes an error term whose value is typical for the value of $\Delta T$ and of the phase modulation method used.

The measuring arrangement needed for the implementation of the method which is the subject of the invention consists of a measurement receiver 2 for envelope demodulation which is connected to receiving antenna 1 at the location of reception. For further processing, the output signals of measuring receiver 2 are put on an analog/digital converter 3 which is interfaced with the measuring receiver 2. This converter samples the output signal of the measuring receiver in time intervals of $\Delta T$ and processes it further by quantizing it via a computer 4 which is interfaced after the analog/digital converter 3.

BRIEF DESCRIPTION OF THE DRAWING

The present invention will be better understood from the following detailed description of a preferred embodiment of the invention, taken in conjunction with the accompanying drawing, which is a block diagram illustrating a preferred embodiment of the invention.

DESCRIPTION OF THE PREFERRED EMBODIMENT

The method of the invention for the determination of C/I presupposes the phase modulation of high-frequency carrier waves within the transmission band. In the block diagram depicted in the figure of the arrangement of the invention, Block 1 designates the receiver antenna at the location of reception. Block 2 represents a measuring receiver used for the demodulation of the envelope function of the signal transmitted by the receiving antenna.

For further processing, the output signal of the measuring receiver 2 goes to an analog/digital converter 3 which is interfaced after the measuring receiver 2, which in turn samples the output signal of the measuring receiver 2 in time intervals of $\Delta T$ during a measurement time of $T_{ges}$ and makes it accessible for quantization to a computer 4 which is interfaced after the analog/digital converter 3. One possible means of realizing this is seen in the use of a personal computer. In such a case, the analog/digital converter 3 consists of an off-the-shelf plug-in card integrated in the personal computer which allows a maximum sampling frequency of 200 kHz. A maximum sampling frequency of 200 kHz corresponds to the minimum time $\Delta T$ between two adjacent sampling time points of 5 μs.

The theoretical fundamentals of the method of the invention are described in greater detail in the following: The signal of the desired carrier (wanted signal C) received at the receiving antenna 1 at the location of reception can be described as $$s(t) = S(t)\sin\{2\pi f_0 t + \phi(t)\} \quad (1)$$

wherein $\phi(t)$ contains the information to be transmitted and may, for the modulation used within the GSM mobile communication network, be expressed in greater detail as $$\phi(t) = \sum_{i=0}^{N} a_i \pi h \int_{-\infty}^{t-iT} g(r)dr \quad (2)$$

In equation (2), g(r) represents the initial transmitter pulse (Gaussian pulse), h takes on the value 0.5 for GMSK (modulation index), i represents the symbol index, and $a_i \in (+1, -1)$ are the symbols to be transmitted. Due to fading influences, the amplitude of the signal received is time-dependent, which is expressed through S(t).

In the following, only the more difficult case of a common-channel interferer shall be analyzed theoretically. However, the new method is in the same way applicable also in the case of adjacent-channel interference. For the signal of a common-channel interferer at the location of reception, the notation $$i(t) = I(t)\sin(2\pi f_0 t + \alpha(t) + \phi_0) \quad (3)$$

applies, with $\phi_0$ being a zero-phase angle. The time dependability of the amplitude also applies for the interferer signal, due to fading influences, expressed as I(t).

For the combined signal of s(t) and i(t) the following is true:

$$r(t) = s(t) + i(t) = \sqrt{S^2(t) + I^2(t) + 2S(t)I(t)\cos\Psi(t)} \cdot \quad (4)$$

$$\sin\left\{2\pi f_0 t + \phi(t) + \arctan\left(\frac{S(t)\sin\phi(t)}{I(t) + S(t)\sin\phi(t)}\right)\right\}$$

with $$\Psi(t) = \alpha(t) - \phi(t) + \phi_0 \quad (5)$$

The following analyzes the square of the envelope function which is derived from $$R^2(t) = S^2(t) + I^2(t) + 2S(t)I(t)\cos\Psi(t) \quad (6)$$

The square of the envelope function according to equation (6) contains the summands $s^2(t) + I^2(t)$ which fluctuate with $$f_s \approx \frac{v}{\lambda} \quad (7)$$

as well as the summand $2S(t)I(t)\cos(t)$ which fluctuates with a frequency $$\frac{d}{dt}\{\Psi(t)\} >> f_s \quad (8)$$

due to phase modulation of signals and noises. Thanks to equation (8), the term $S^2(t) + I^2(t)$ can be separated from term $2S(t)I(t)\cos(t)$ and the determination of C/I can be made.

The determination of C/I is based upon the procedure described hereafter:

In doing so, it must be assumed that (t) is equally distributed throughout the interval $\{0.2\pi\}$. For a simplified notation, let $$X = \overline{S^2(t)} + \overline{I^2(t)} \quad (9)$$

and $$Y = \overline{2(2S(t)I(t)\cos\Psi(t))^2} = 4\overline{S^2(t)I^2(t)}, \quad (10)$$

whereby the bar represents the action of generating the mean value in terms of time. By solving equation (9) and equation (10), the C/I ratio to be determined follows:

$$C/I = \frac{\overline{S^2(t)}}{\overline{I^2(t)}} = \frac{X + \sqrt{X^2 - Y}}{X - \sqrt{X^2 - Y}} \quad (11)$$

In terms of measurements, the following sums are arrived at by digitizing and processing with the aid of a personal computer 4:

$$X = \frac{1}{N}\sum_{i=1}^{N} R^2(t_i) = \overline{S^2(t)} + \overline{I^2(t)} + \overline{2S(t)I(t)\cos\Psi(t)} \quad (12)$$

and, furthermore, taking into account the square of the envelope function which is generated through $t_i + \Delta T$, $$Y = \frac{1}{N}\sum_{i=1}^{N}\{R^2(t_i) - R^2(t_i + \Delta T)\}^2$$

$$= \overline{Z^2(t)} + 4\overline{Z(t)[S(t)I(t)\cos\Psi(t) - S(t+\Delta T)I(t+\Delta T)\cos\Psi(t+\Delta T)]}$$

$$+ 4\overline{[S^2(t)I^2(t)\cos^2\Psi(t)}$$

$$- 2\overline{S(t)S(t+\Delta T)I(t+\Delta T)\cos\Psi(t)\cos\Psi(t+\Delta T)]}$$

$$+ 4\overline{S^2(t+\Delta T)I^2(t+\Delta T)\cos^2\Psi(t+\Delta T)} \quad (13)$$

with $$Z(t)=S^2(t)-S^2(t+\Delta T)+I^2(t)-I^2(t+\Delta T). \tag{14}$$

The parameter $\Delta T$ must be selected such that the terms $S(t) \approx I(t+\Delta T)$ and $\overline{\cos(t)\cos(t+\Delta T)} \approx 0$ are fulfilled. If these terms are fulfilled, then Y'=Y and X'=X, so that the C/I determination can be done according to equation (11).

Test results showed that the terms $S(t) \approx S(t+\Delta T)$ and $I(t) \approx (t+\Delta T)$ for $\Delta T \leq 100$ μs are fulfilled sufficiently well for an application in the GSM network. Furthermore, the term $2\overline{S(t)I(t)\cos(t)}$ from equation (12), given sufficiently long measuring times ($\leq 1$ s), becomes approximately zero, so that X'=X is fulfilled. In addition, measurements with signals modulated according to GSM show that the term $\overline{\cos(t)\cos(t+\Delta T)} \approx 0$ for times $\Delta T \leq 5$ μs is not fulfilled.

However, equation (13) can be simplified to the expression $$Y'=4\overline{S^2(t)I^2(t)}\{1-2\overline{\cos\Psi(t)\cos\Psi(t+\Delta T)}\} \tag{15}$$

for times $\Delta T \leq 100$ μs. Thereby, $2\cos(t)\cos(t+\Delta T)$ describes an "Error term" whose value is typical for the value of $\Delta T$ and the phase modulation method used. Via laboratory measurements the value of this error term can be determined to be k.

The error term k includes a measure for the correlation and/or similarity of the phase differences (t) and (t+$\Delta T$).

$\Delta T$, for example, thus becomes $$k=2\overline{\cos\Psi(t)\cos\Psi(t+\Delta T)}=2\overline{\cos^2\Psi(t)}=1$$

for $\Delta T > 0$ becomes k<1
for $\Delta T \to \infty$ becomes k=0.

This means that if two phase differences between s(t) and i(t) involve an infinite interval ($\Delta T \to \infty$), then they have no correlation to each other.

With the error term k, Y' can be corrected so that $$Y = \frac{1}{1-k} Y' \tag{16}$$

applies and equation (11) can be used for the determination of the C/I ratio.

The determination of the C/I ratio shall be explained in more detail in the following possible example. The steps for the determination of the C/I ratio must proceed in such a way that at first, during a measuring time of, say, 4 s all sampling values of the analog/digital converter 3 are stored in the computer 4. Using a sampling rate of 200 kHz, this amounts to a total of 4s•200000s$^{-1}$=800000 values of the square of the envelope function R$^2$(t). First, with these 1–N=800000 values the sums for X' according to equation (12) and for Y' according to equation (13) are calculated by means of the computer 4. For equation (13), the parameter $\Delta T$ is generated from the time interval of adjacent sampling values for $\Delta T=5$ μs. Then, taking into consideration the correction factor k according to equation (16), the results of this calculation for X' and Y' are plugged in for Y' in equation (11) and the C/I ratio is calculated by the computer 4. After these calculations are completed and stored, for example, for subsequent processing, with the storage preferably to take place via the computer 4, then another recording of sampling values and subsequent calculation of the C/I ratio can be undertaken.

A further convenient application of the solution of the invention is accomplished in that the computer 4 is additionally interfaced with a GPS receiver (Global Positioning System) 5. In addition to the C/I ratio, the location data supplied via the GPS receiver is stored, so that the possibility of a location-dependent presentation of the C/I ratio which is important to the application can be obtained, since the new method is preferably operated from a moving measuring vehicle.

The method of the invention distinguishes itself in that the measurement of the C/I ratio may be derived without performing extensive calibration measurements. Instead, it is derived by using the measured receiving power as a function of time and an analytical calculation of the C/I ratio from the values of the function of this time function. Furthermore, typical characteristics of the GSM mobile communication network, such as the time-division multiplex frame structure (TDMA), are being properly processed by the method of the invention. The C/I ratio is determined not by an indirect way of using auxiliary values, such as bit error rate (RXQUAL), but by way of directly using the influencing values, namely those derived from the variation in time of the resulting receiving power which is generated from entities of Carrier C and of interferer I at the location of reception. In this way, the new method works without any intervention into the actual network operation. Another advantage of the new method results from the fact that it requires only minimal hardware to execute the required measurements necessary.

I claim:

1. A method for determining the signal to noise (C/I) ratio for common-channel and adjacent-channel interferers in a digital mobile communication network, comprising the steps of:

receiving a signal having a wanted signal s(t) and a noise signal i(t) at a receiver antenna;

subjecting the received signal to an envelope demodulation;

determining the values of an envelope function R(t) in selected time intervals of $\Delta T$ during a defined measurement time $T_{ges}$ by sampling and digitizing the signal subject to the envelope demodulation, whereby N pairs of sampling values of the envelope function R(t) are digitized and stored at times ti and ti+$\Delta T$, where i=1–N, as a consecutive sequence of 1–N of the square of the envelope function R$^2$(t);

generating auxiliary values X' and Y' from the stored 1–N values of the square of the envelope function, the auxiliary value X' being determined by adding up the 1–N individual squares and dividing the sum by N, and the auxiliary value Y' being determined by first computing the N differences of the sampling values of the envelope function at time intervals $\Delta T$, squaring the differences, adding up the total of the squared differences, and dividing by N;

applying a correction factor k so that the value Y' is corrected to value Y which is proportional to four times the product of the individual powers of the wanted signal s(t) and the noise signal i(t);

letting X'=X, $$Y = \frac{1}{1-k} Y',$$

and determining the signal to noise ratio C/I from the following relationship:

$$C/I = \frac{X + \sqrt{X^2 - Y}}{X - \sqrt{X^2 - Y}}.$$

2. The method as claimed in claim 1, wherein the signal is subjected to the envelope demodulation at a measuring receiver interfaced with the receiving antenna, and the output of the measuring receiver is connected to an analog to digital converter which samples the measuring receiver output at time intervals $T_{ges}$ during measurement time $\Delta T$ and the steps of determining the values X', Y', applying the correction factor k and determining C/I are carried out by connecting the sampled, digitized output of the analog to digital converter to a computer, storing the digital data in the computer, and programing the computer to process the stored data in order to determine the values X', Y', X, Y and C/I.

3. The method as claimed in claim 2, including the steps of interfacing a GPS receiver with the computer, supplying the computer with location data detected from a mobile measuring vehicle by the GPS receiver, and using the location data to produce a location dependent presentation of the C/I ratio.

4. Apparatus for determining the signal to noise (C/I) ratio for common-channel and adjacent-channel interferers in a digital mobile communication network, comprising:

a receiver antenna for receiving a signal having a wanted signal s(t) and a noise signal i(t);

a measuring receiver connected to the antenna output for subjecting the received signal to an envelope demodulation and producing an envelope function output signal R(t);

an analog/digital converter interfaced with the measuring receiver for sampling the envelope function output signal of the measuring receiver in selected time intervals of $\Delta T$ during a defined measurement time $T_{ges}$;

a computer connected to the output of the analog/digital converter for receiving the sampling values from the converter, whereby N pairs of sampling values of the envelope function R(t) are digitized and stored at times ti and ti+$\Delta T$, where i=1–N, as a consecutive sequence of 1–N of the square of the envelope function $R^2(t)$;

the computer further comprising means for generating auxiliary values X' and Y' from the stored 1–N values of the square of the envelope function, the auxiliary value X' being determined by adding up the 1–N individual squares and dividing the sum by N, and the auxiliary value Y' being determined by first computing the N differences of the sampling values of the envelope function at time intervals $\Delta T$, squaring the differences, adding up the total of the squared differences, and dividing by N;

means for applying a correction factor k so that the value Y' is corrected to value Y which is proportional to four times the product of the individual powers of the wanted signal s(t) and the noise signal i(t); and means for determining the signal to noise ratio C/I from the following relationship:

$$C/I = \frac{X + \sqrt{X^2 - Y}}{X - \sqrt{X^2 - Y}},$$

where X'=X and $$Y = \frac{1}{1-k} Y'.$$

* * * * *